United States Patent [19]

Ojima

[11] Patent Number: 5,035,680
[45] Date of Patent: Jul. 30, 1991

[54] BELT OR CHAIN TENSIONER FOR POWER TRANSMITTING SYSTEM

[75] Inventor: Juji Ojima, Aikawa, Japan

[73] Assignee: NHK Spring Co., Ltd., Yokohama, Japan

[21] Appl. No.: 545,693

[22] Filed: Jun. 29, 1990

[30] Foreign Application Priority Data

Jul. 5, 1989 [JP] Japan .................. 1-173549

[51] Int. Cl.⁵ .............................. F16H 7/08
[52] U.S. Cl. ................................ 474/138
[58] Field of Search .......... 474/101, 109-11, 474/113-117, 133, 135, 136, 138

[56] References Cited

U.S. PATENT DOCUMENTS 4,863,417  9/1989  KImata et al. ............. 474/111 X
4,902,266  2/1990  Ojima et al. ............... 474/138 X Primary Examiner—Thuy M. Bui
Attorney, Agent, or Firm—Fleit, Jacobson, Cohn, Price, Holman & Stern

[57] ABSTRACT

A belt or chain tensioner whereby a resonance due to chain or belt vibration is alleviated by means of hysteresis loss obtained by friction between adjacent elements of a reversely and closely wound multiple compression spring which urges a tension rod.

3 Claims, 2 Drawing Sheets

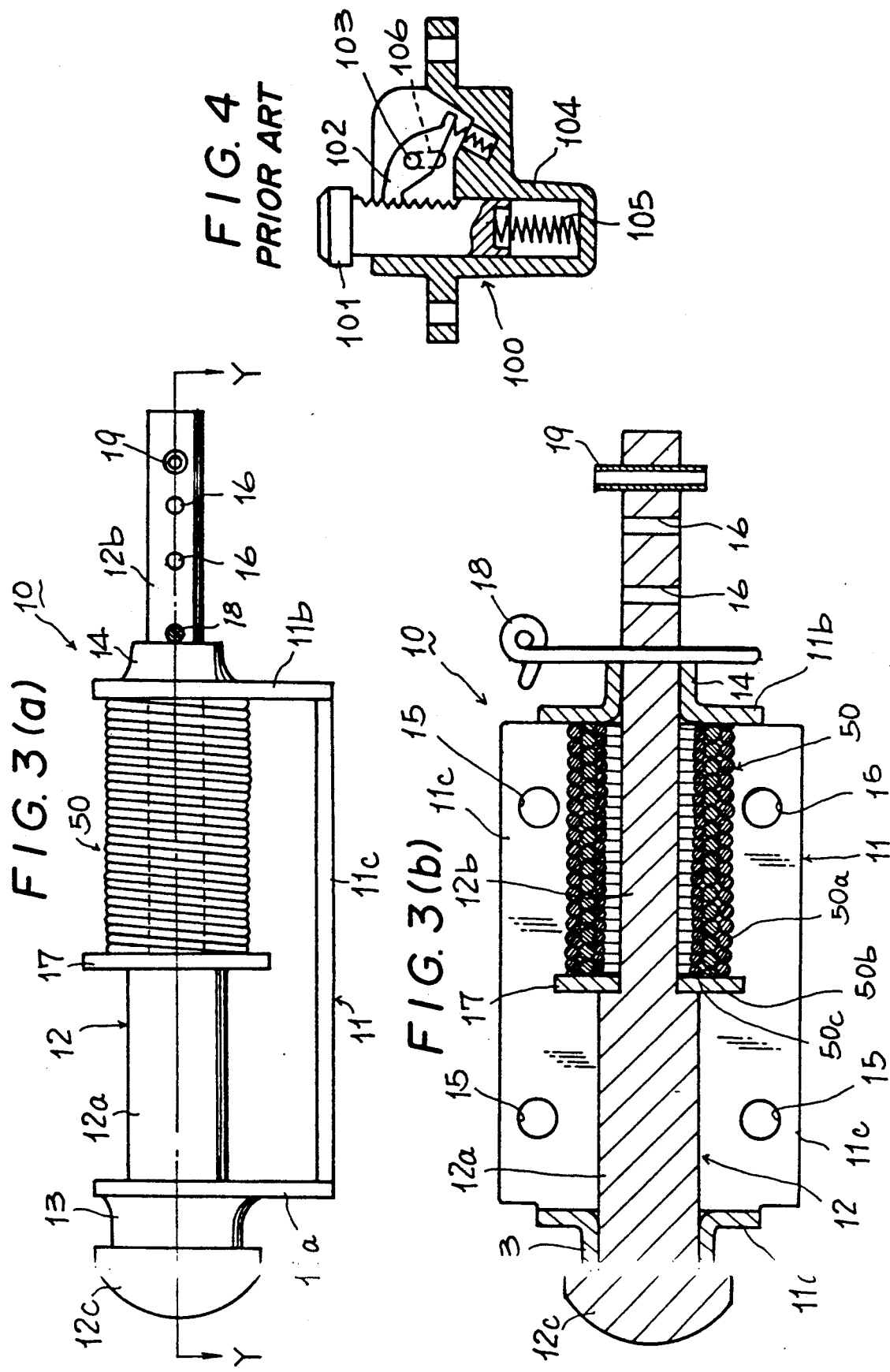

BELT OR CHAIN TENSIONER FOR POWER TRANSMITTING SYSTEM

BACKGROUND OF THE INVENTION

The present invention relates to a tensioner for tensing belt or chain adequately by using urging tensioning a rod, more particularly to such tensioner having a compression spring for urging tension rod.

This type of tensioner has shown the following problems: when a tension rod is excessively urged and does not return due to the excessive variation of driving torque, the belt or chain becomes excessively tensioned sometimes causing buzzing or until causing excessive wear on itself. Taking this undesirable situation in consideration, a tensioner 100 has been disclosed by the Japanese Utility Model Application Laid-open No. 62-13257 whereby said tension rod has been provided with a restoring capacity.

As shown in the FIG. 4, the tension rod 101 of tensioner 100 for tensioning a chain is mounted in a casing 104 so as to be urged freely by a compression spring 105. The tension rod 101 is formed with a rack on its side and the mating pawls of ratchet 102 are engaged with the rack. A shaft 103 fixed on the ratchet 102 is inserted in the vertical slot 106 so that the ratchet pawls may slip on the rack to change its position. When the chain is slackened, normally the tension rod 101 advances to keep adequate tension on it, the wack or returning stroke of tension rod 101 is controlled by the ratchet pawl 102. On the other hand, when the chain is excessively tensioned due to the excessive advance of tension rod 101, the shaft 103 of the ratchet works to alleviate excessive tension.

Hereinafter the problems to be solved by the invention will be explained. Since the back stroke of tension rod 101 is controlled by the ratchet pawl 102, the shaft 103 and vertical slot 105 as aforementioned, the back stroke of the tension rod 101 excessively urged by the resonant amplitude of belt or chain is reduced and when the shaft 103 of ratchet pawl hits on the bottom of vertical slot 106 after coursing the full stroke of slot, the tension rod 101 does not function to alleviate excessive tension of chain or chain because the tensioner turns only a rigid object against the counterforce of belt or chain.

The present invention has been developed considering the above situations and is to provide a tensioner having a prompt response to slackening, an ability to alleviate excessive tension on belt or chain and a simple and compact construction.

SUMMARY OF THE DISCLOSURE

In order to carry out the above purpose, the belt or chain tensioner for keeping adequate tension on belt or chain by using an urging tension rod according to the present invention comprises a multiple compression spring having coaxial multiple springs reversely wound for urging a tension rod.

BRIEF DESCRIPTION OF THE DRAWINGS

FIG. 3(a) shows a lateral view of other embodiment of the present invention and FIG. 3(b) shows a sectional view taken along line Y—Y of FIG. 3(b).

FIG. 4 shows a section of a tensioner according to the prior art.

EMBODIMENT

Figure 1A:
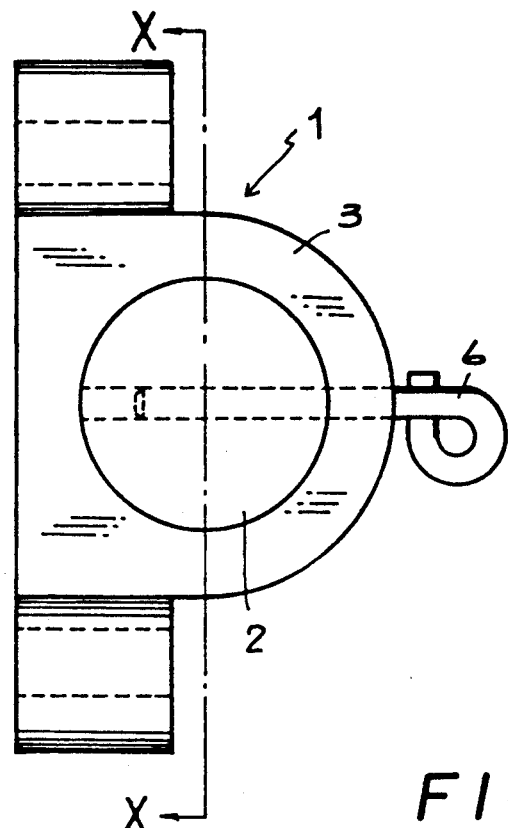
FIG. 1(a) shows a front view of one embodiment of the present invention.

Hereinafter one embodiment a chain tensioner according to the present invention will be detailed, referring to in particular FIGS. 1(a), 1(b) and 2.

A tension rod 2 is inserted freely in a cup type casing 3 of tensioner 1. The open end of cup type tension rod 2 abuts on the bottom 3a of the casing 3 and a double compression spring 5 is mounted between the bottom 3a of the casing 3 and the bottom 4a of tension rod 2. The tension rod 2 urged by the double compression spring 5 is secured in the casing by a stopper pin 6 inserted in the tension rod 2 and the casing 3.

Numeral 7 indicates wings formed on both sides of a bracket for fixing the tensioner, on determined equipment, wherein two holes 7a are formed for fixing. Numeral 8 shows an "O" ring fit in a inner ring groove of the casing 3, whereby the casing 3 is sealed.

Figure 2:
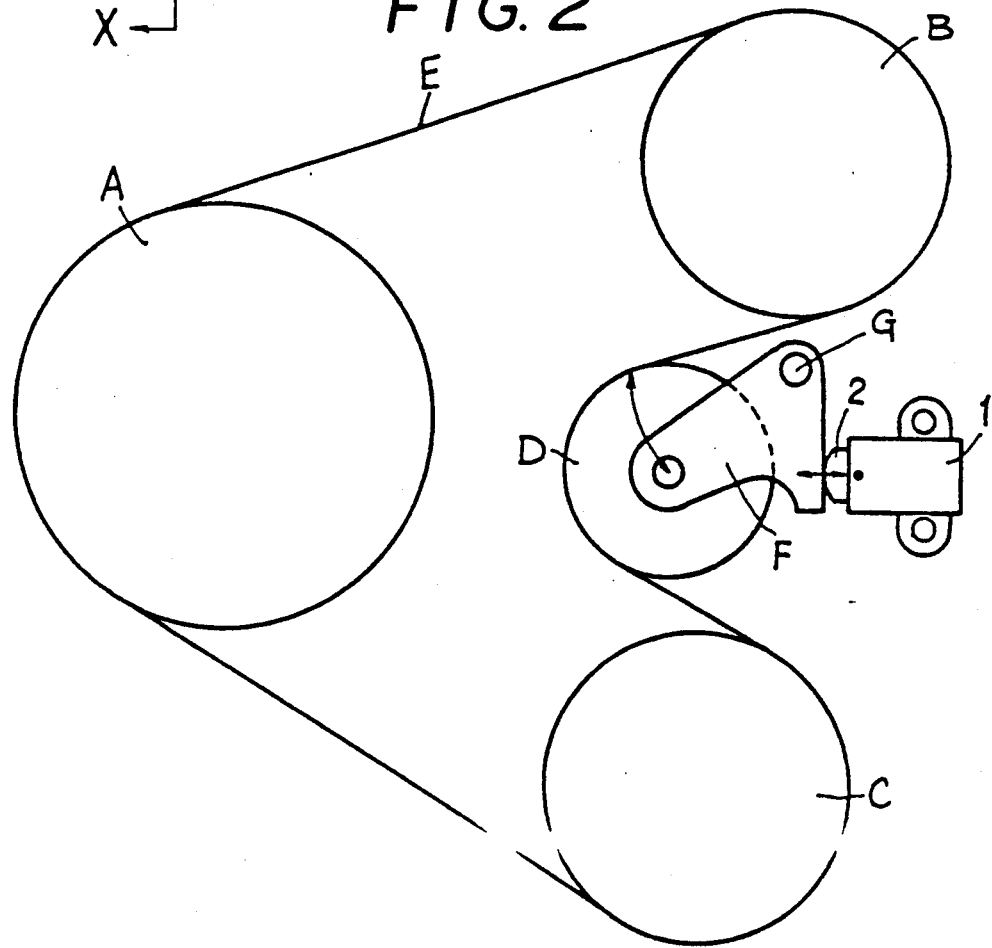
FIG. 2 shows an application of the tensioner shown in the FIGS. 1(a) and (b).

This type of tensioner is used to apply adequate tension on a belt E mounted on three pulleys A, B and C, mounted in predetermined positions as shown in the FIG. 2. An adequate tension can be applied on the belt E by means of a tension pulley D urged by the tensioner 1. The tension pulley D is mounted on an arm F pivoted with a pin G. so as to rotate freely around the pin G and The tension pulley D is urged by the arm F, which arm F is urged by the round head of tension rod 2, which in turn is urged by the compression spring 5, so as to press the tension pulley on the belt E. The tension rod 2 can be released when the stopper pin 6 is taken off.

The compression spring 5 is a double compression spring wherein a plurality of compression spring are coaxially mounted so that the winding direction of adjacent compression springs are mutually opposed. According to this embodiment, the double compression spring 5 comprises an outer compression spring 5a and an inner compression spring 5b closely inserted in the outer compression spring 5a. The winding directions of outer spring 5a and inner spring 5b are opposite each other, accordingly both compression springs do not bite each other.

The double compression spring can be made easily of an outer compression spring 5a and an inner compression spring 5b by inserting an inner compression spring 5b having a little larger diameter than the inner diameter of outer compression spring 5a into the outer compression spring 5a by rotating it in the direction for reducing its diameter. The diameter reducing direction of the inner compression spring 5b is the diameter enlarging direction of the outer compression spring 5a. After inserting, a diameter reducing force remains in the outer compression spring 5a and a diameter enlarging force remains in the inner compression spring 5b, then completing a close mounting of both compression springs 5a and 5b.

Also they can be mounted by means of thermal elongation and shrinking due to the difference of materials of both compression springs 5a and 5b.

For example, an inner compression spring 5b made of steel SUS and an outer compression spring 5a made of carbon steel SWP or SW are used and the outer diameter of inner compression spring 5b is adequate for inserting in the outer compression spring 5a. These compression springs are mounted coaxially and then they are annealed at low temperature to get a closely wound double compression spring 5.

When they are annealed at low temperature, the diameter of the inner compression spring 5b made of steel SUS becomes larger by loosing residual tension and the diameter of outer compression spring 5a made of steel carbon becomes smaller, resulting in shrinkage fit.

A tensioner 1 provided with this type of double compression spring 5 can press a tension pulley D on belt E by urging tension rod with the sum of urging force of two compression springs 5a and 5b. When this applied tension becomes even with the counterforce of belt E, the belt E can be tensioned at predetermined tension. Even though there is an excessive counterforce from the belt E, the tension rod 2 retreats back into the casing 3 compressing the double compression spring 5, then preventing an excessive tension on the belt E.

When resonance occurs on the belt E, there occurs a friction between the outer compression spring 5a and the inner compression spring 5b due to which the resonance can be alleviated effectively by means of hysteresis due to the friction between the springs.

This double compression spring 5 is used not only for above tensioner, but any tensioner wherein a tension rod is urged by a double compression spring.

In the FIGS. 3(a) and 3(b), a tensioner 10 of another embodiment is shown.

The tensioner 10 chiefly comprises a tension rod 12 slidably supported by a casing 11 having a front bearing 13 and rear bearing 14 and a compression spring 50 mounted between a spring seat 17 and the rear bearing 14. The front and rear bearings 13 and 14 are formed on the casing made of sheet metal. There are four holes 15 formed on the casing for fixing. The front bearing 13 is of larger diameter than the rear bearing 14.

The tension rod 12 has a larger diameter portion 12a and a smaller diameter portion 12b. The head of tension rod 12 is rounded so as to abut on the tension pulley D such as shown in FIG. 2. On the rear end of tension rod, a plurality of through holes are formed perpendicularly at the predetermined distances. The tension rod 12 can be mounted by inserting through the bearings 13 and 14 from the left side so as to slide freely on the bearings.

The three layered compression spring 50 consists of outer compression spring 50a, intermediate compression spring 50b and inner compression spring 50c. They are closely wound and the outer and inner compression springs are wound oppositely in relation to the intermediate compression spring.

The three layered compression spring 50 is mounted between the rear bearing 14 and the spring seat 17 of which movement to front is limited by the step between the larger diameter portion 12a and the smaller diameter portion 12b of the tension rod 12. The tension rod 12 is urged by the compresion spring 50, but the movement of tension rod to the front is limited by a stopper pin 18 inserted in a through hole on the tail portion of tension rod. In FIGS. 3(a) and 3(b), numeral 19 indicates a spring pin fit in a through hole perpendicularly formed on the end of tail portion. The maximum stroke of the tension rod 2 is limited by the spring pin 19.

This type of tensioner 10 can be used in the same manner as the tensioner 1 aforementioned.

The tensioner 10 is fixed by means of through holes on a supporting component with its head 12c facing the pulley D. Then the stopper pin 18 is taken out so as to release the tension rod 2 to apply an adequate tension on the belt E.

Even though the tensioner 10 receives an excessive counterforce by the vibration of belt E, the tension rod 12 retreats backward by means of three layered compression spring 50 avoiding an excessive tension on the belt.

Further, when resonance occurs on the belt E, the resonance can be effectively alleviated by the hysteresis due to the friction between the spring components such as outer compression spring 50a, inner compression spring 50c and intermediate compression spring 50b.

Also the stroke of the tension rod 12 can be made larger and the axial motion of the tensioner 12 can be improved because of the bearings 13 and 14 being located away from each other. Also, this type of tensioner can be manufactured at lower cost than common tensioners, by dispensing with a die cast casing.

Figure 1B:
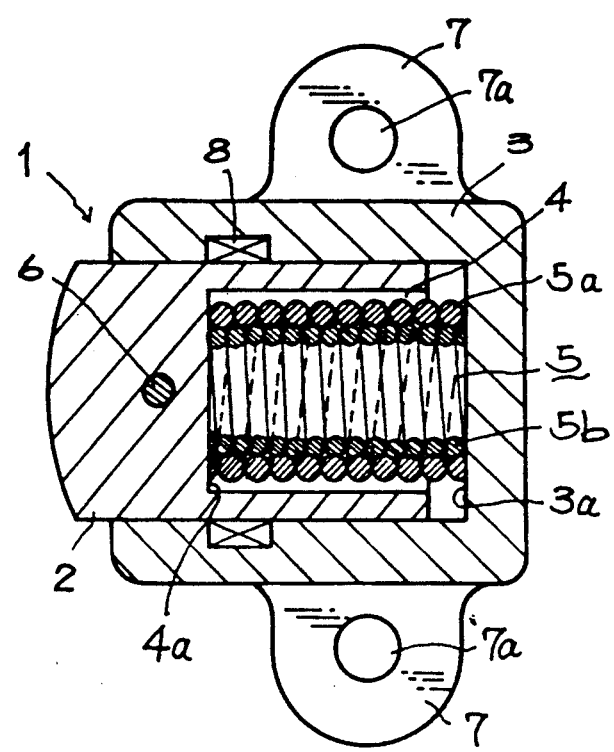
FIG. 1(b) shows a sectional view taken along line X—X of FIG. 1(a).

In addition, the stopper pins 6 and 18 shown in the FIGS. 1(a) and (b) and FIGS. 3(a) and (b) hold urging tension rods during storing and transport and are taken off when mounted on equipments.

The tensioner according to the present invention is not limited to the embodiments aforementioned and other variations may be applied. For example, some damper means may be applied to improve the retreating features of the tension rod or multiple compression springs may be used for the same purpose.

Also, the tensioner according to the present invention is of simple structure and easy to assemble, thus providing a offer light and compact tensioner.

What is claimed is:

1. A tensioner for tensioning a belt or chain adequately, comprising:
    a tension rod;
    a multiple compression spring for urging said tension rod and keeping said tension rod in an urged position, adjacent compression springs of said multiple compression spring being reversely wound and coaxially assembled; and
    a stopper pin inserted in said tension rod for locking the tension rod when not in use.

2. A tensioner according to claim 1, wherein said multiple compression spring comprises a plurality of spring components closely wound so as to obtain radial force.

3. A tensioner according to claim 1, further comprising a casing with front and rear bearings made of sheet metal.

* * * * *